United States Patent

[11] 3,561,620

| [72] | Inventor | Wilfred Ernest Willis<br>3633 Jackson St., San Francisco, Calif. 94118 |
|---|---|---|
| [21] | Appl. No. | 882,363 |
| [22] | Filed | Dec. 15, 1969 |
| [45] | Patented | Feb. 9, 1971<br>Continuation of application Ser. No. 669,169, Sept. 20, 1967, now abandoned. |

[54] SIDE-LOADING ATTACHMENT FOR FORK-LIFT TRUCKS
27 Claims, 24 Drawing Figs.

[52] U.S. Cl. .................................................. 214/16.4, 214/620, 214/730
[51] Int. Cl. .................................................. B65g 1/06, B66f 9/14
[50] Field of Search .................................................. 214/620, 621, 730, 16.16B, 16.18B, 16.42, 38.20, 38.22, 38.46

[56] References Cited
UNITED STATES PATENTS

| 2,073,721 | 3/1937 | Wheelock | 214/16.1(6B) |
| 2,773,614 | 12/1956 | Edwards et al. | 214/38(.46)X |
| 2,804,218 | 8/1957 | Sylvester et al. | 214/38(.20)X |
| 2,925,929 | 2/1960 | Romine | 214/38(.22)X |
| 3,150,787 | 9/1964 | Patrignani | 214/38(.22)X |
| 3,180,513 | 4/1965 | Vander Wal | 214/620 |
| 3,357,582 | 12/1967 | Wittek | 214/512 |

FOREIGN PATENTS

| 699,730 | 12/1964 | Canada | 214/730 |

Primary Examiner—Gerald M. Forlenza
Assistant Examiner—Robert J. Spar
Attorney—Owen, Wickersham & Erickson ABSTRACT: An attachment for forklift trucks can be used in conjunction with load supporting pallets and pallet supporting storage devices to give side loading and unloading. The attachment has a frame with fork receiving sockets, a laterally disposed stabilizer supported on the frame for movement laterally thereof, and a pallet-and-load supporting platform above the stabilizer supported by the frame for movement laterally thereof. There is a mechanism for moving the stabilizer to either side of the frame where it lies wholly beyond the sides of the forklift truck for engagement with and rest upon a pallet supporting storage device on which a pallet and its load are to be deposited, and a mechanism for moving the platform out where it lies wholly beyond the forklift truck and above the stabilizer only after the stabilizer is fully extended and is properly supported by the pallet-supporting storage device.

PATENTED FEB 9 1971 3,561,620
SHEET 1 OF 8
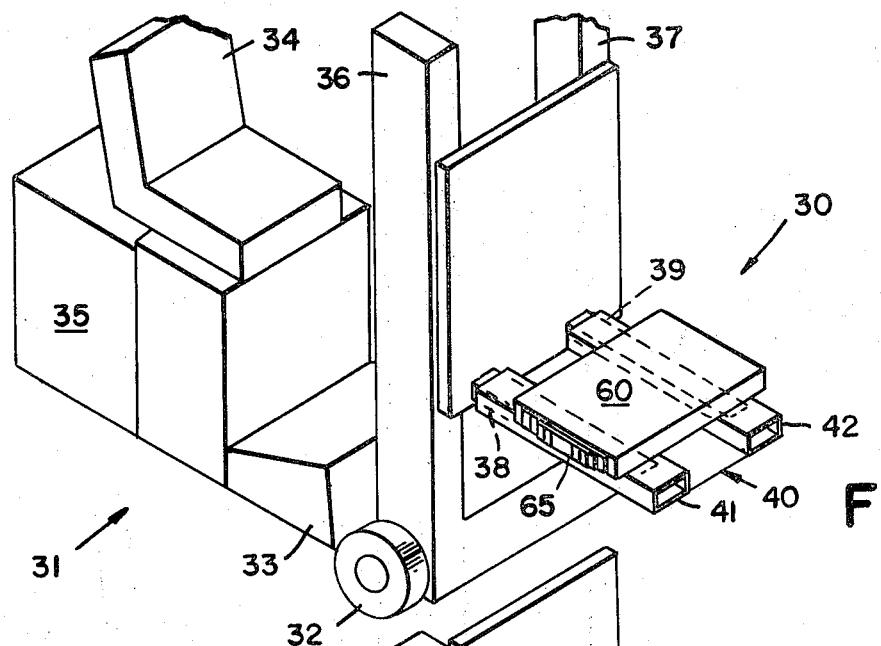
FIG_1
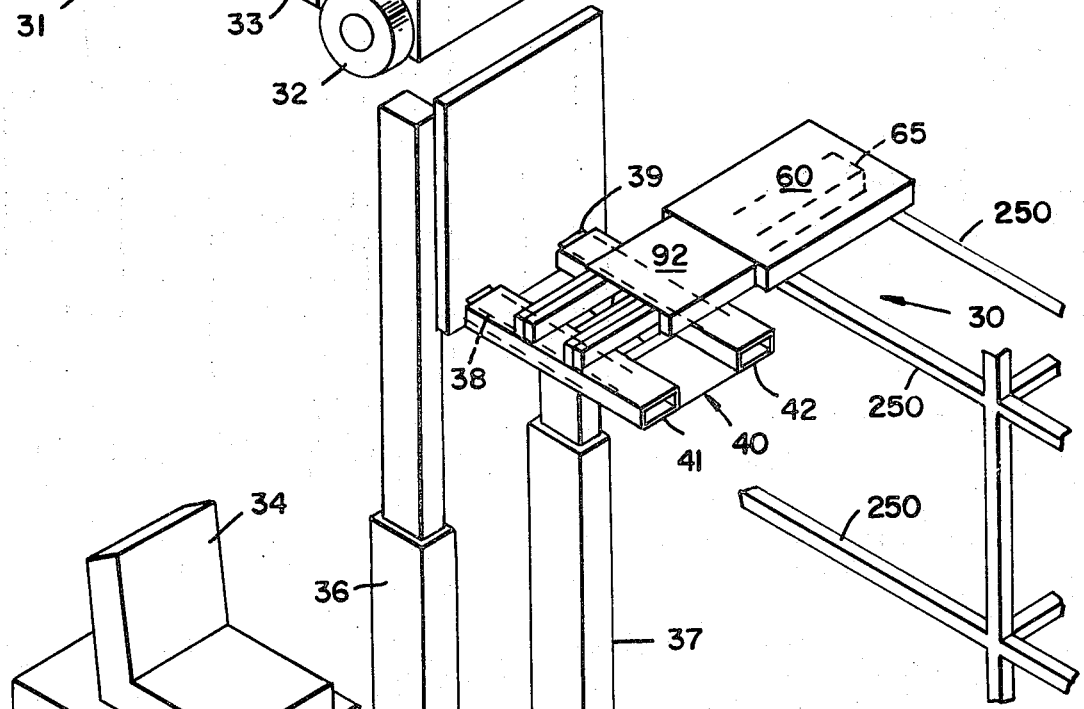
FIG_2
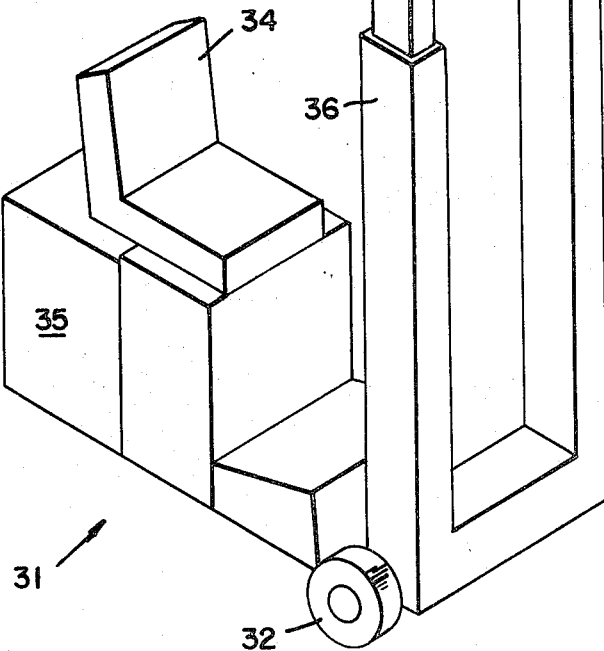
INVENTOR.
WILFRED ERNEST WILLIS
BY
Owen, Wickersham & Erickson
ATTORNEYS

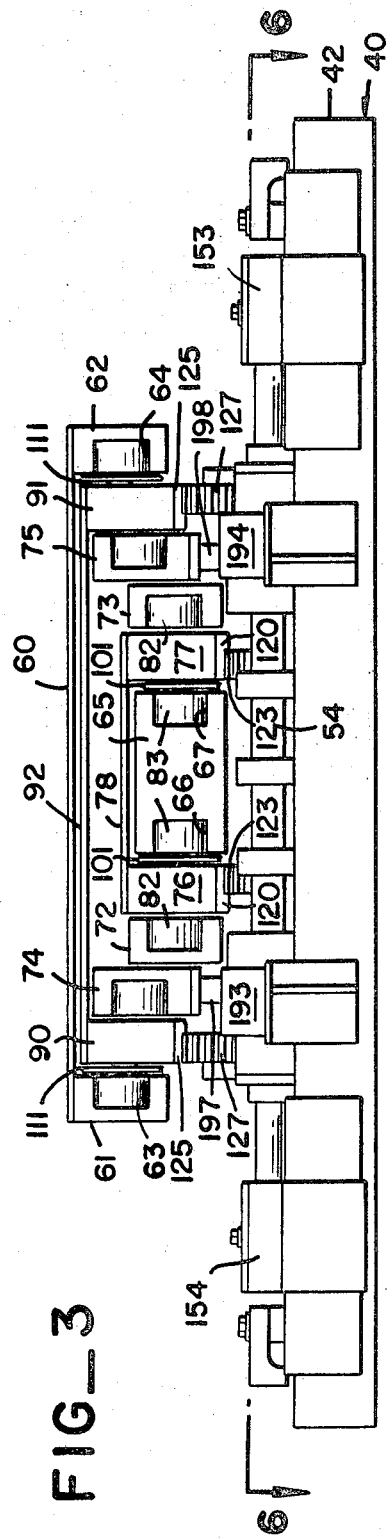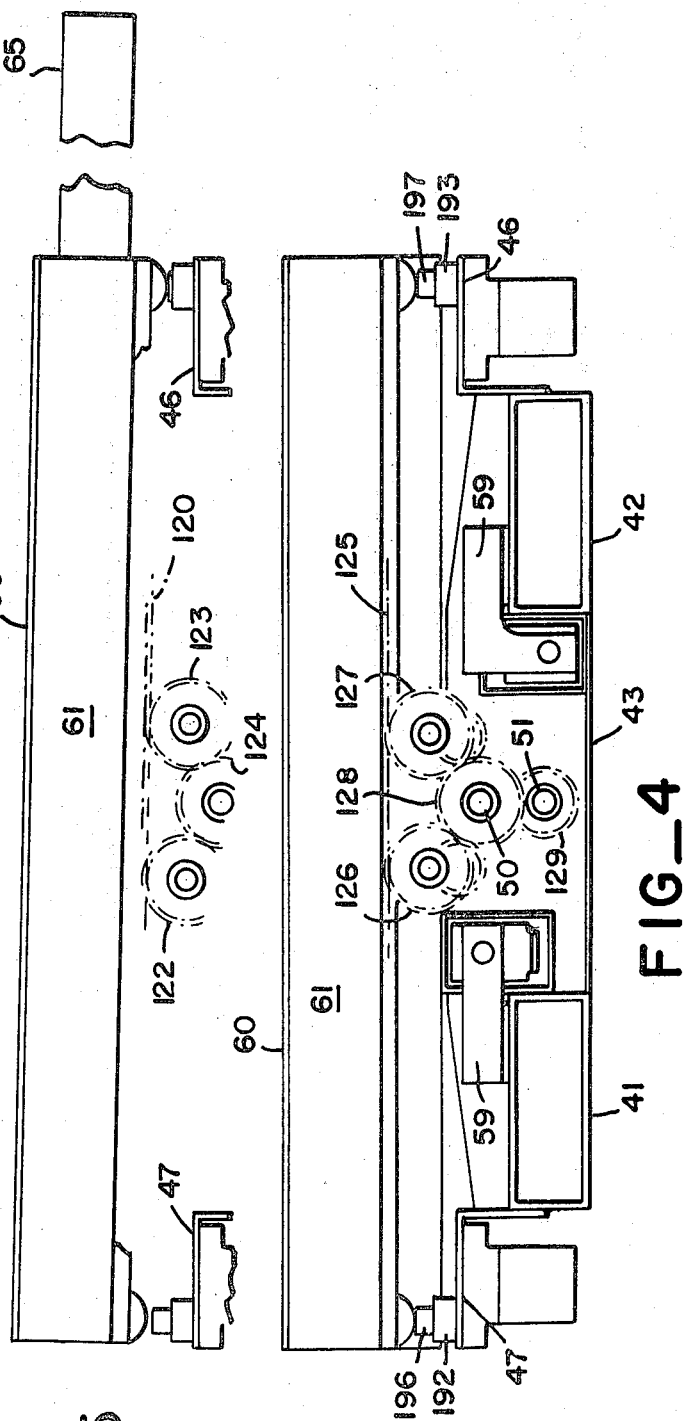

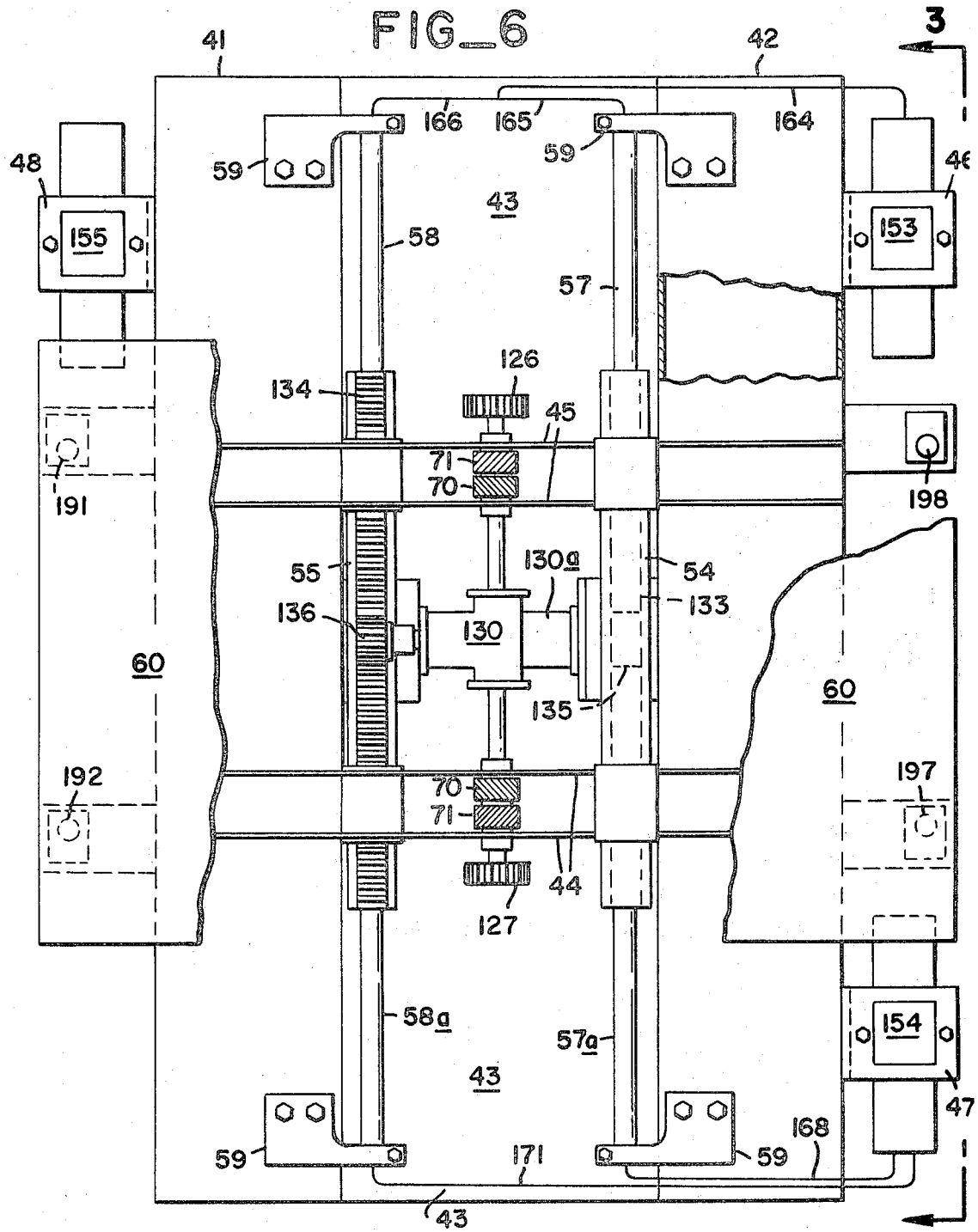

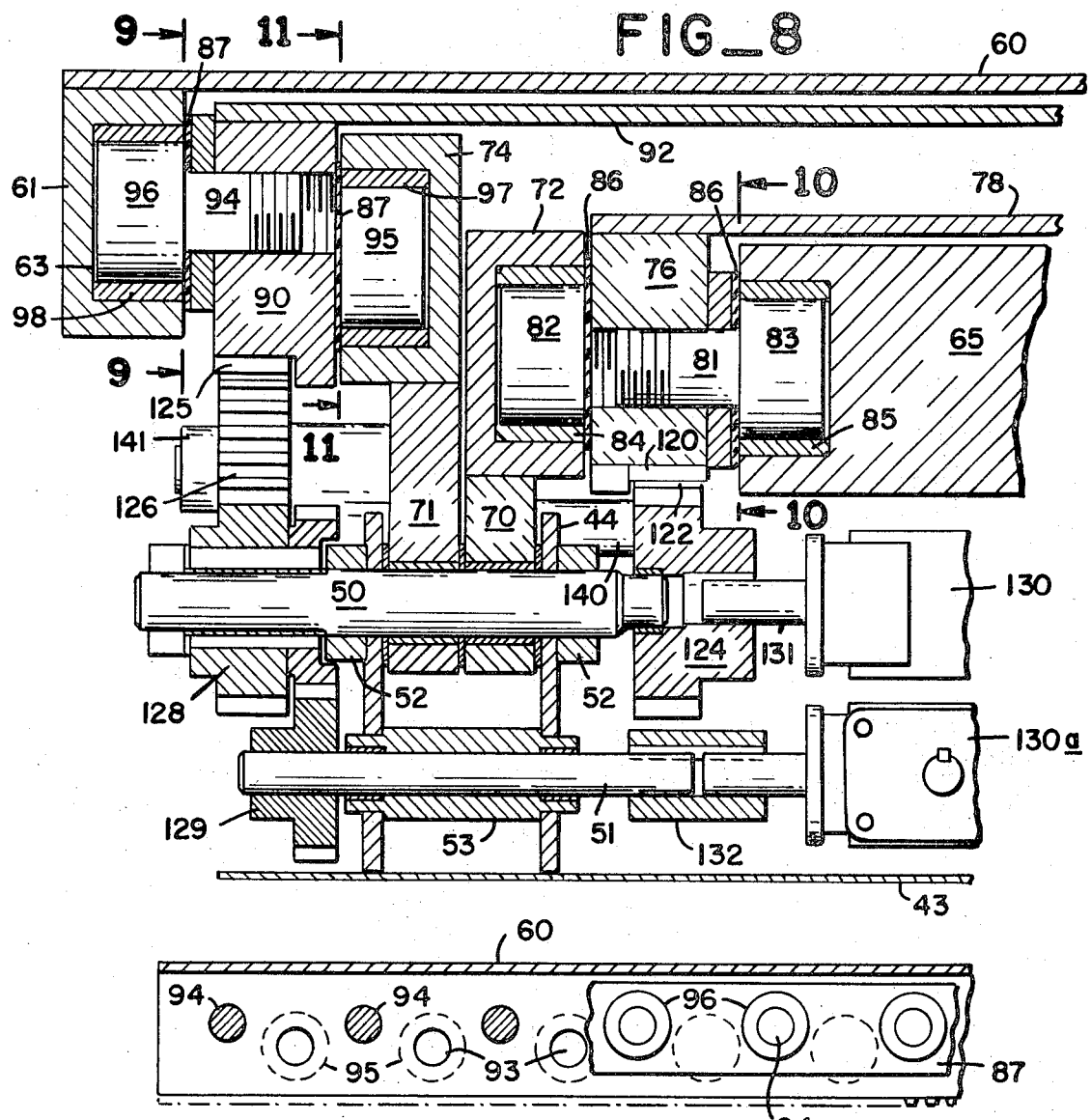
FIG_8
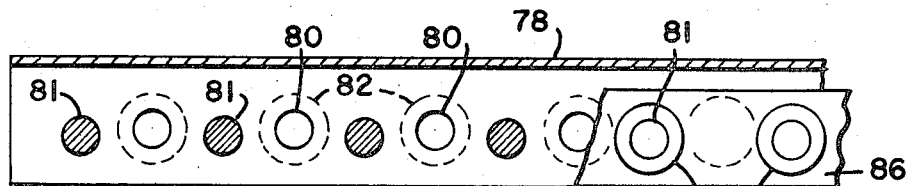
FIG_9
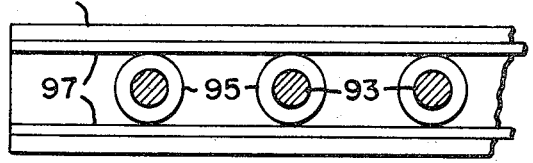
FIG_11
INVENTOR.
WILFRED ERNEST WILLIS
BY
Owen, Wickersham & Erickson
ATTORNEYS

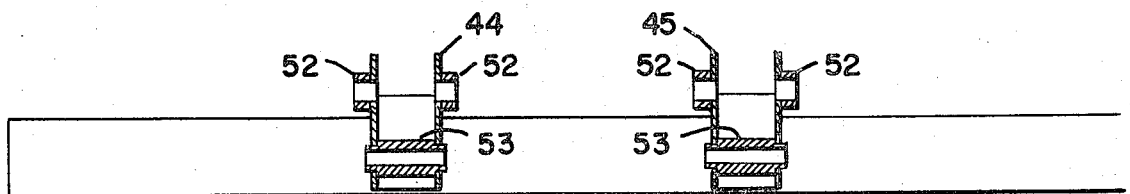
FIG_12
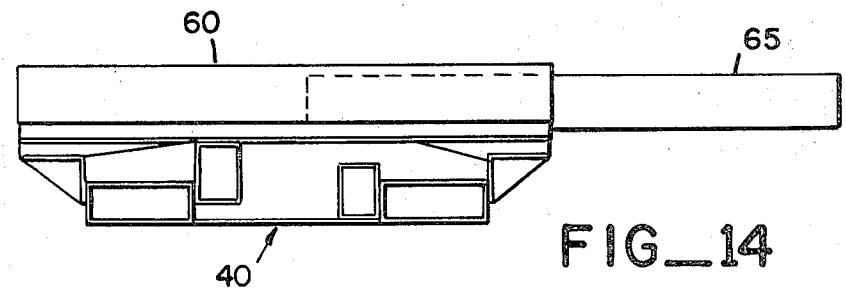
FIG_14
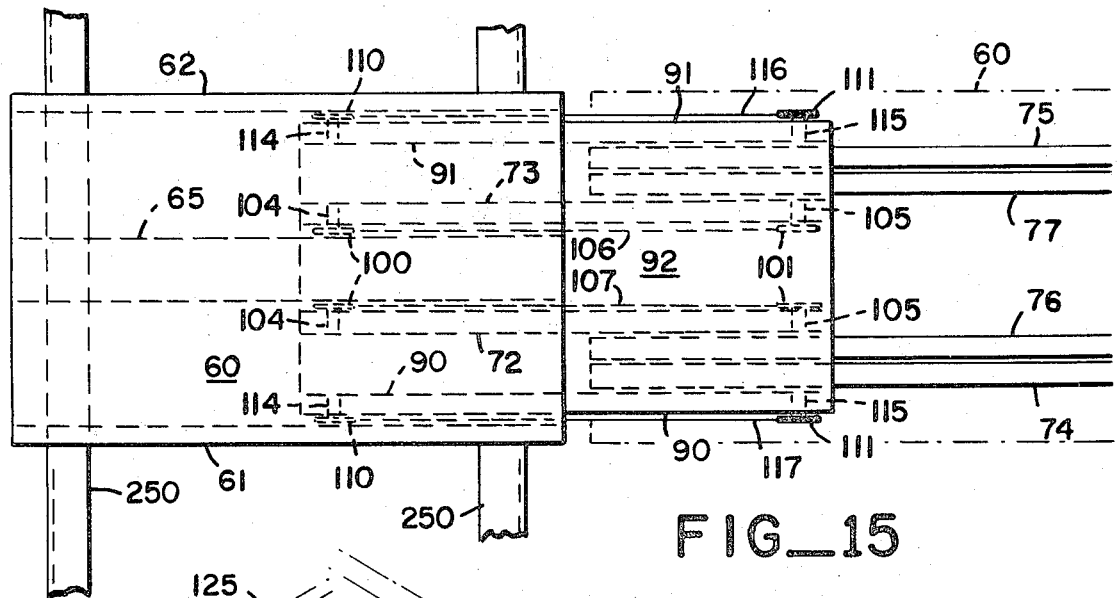
FIG_15
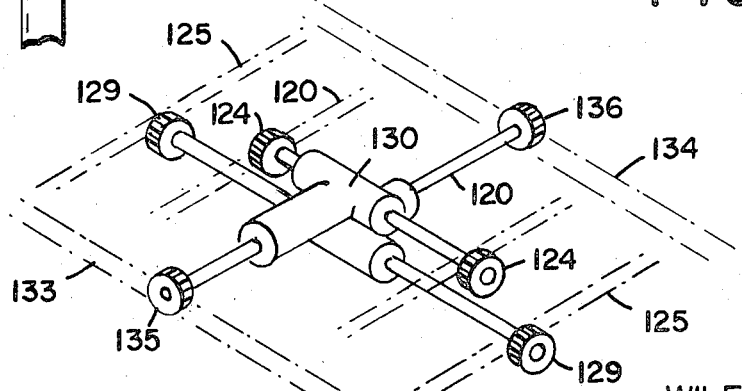
FIG_13

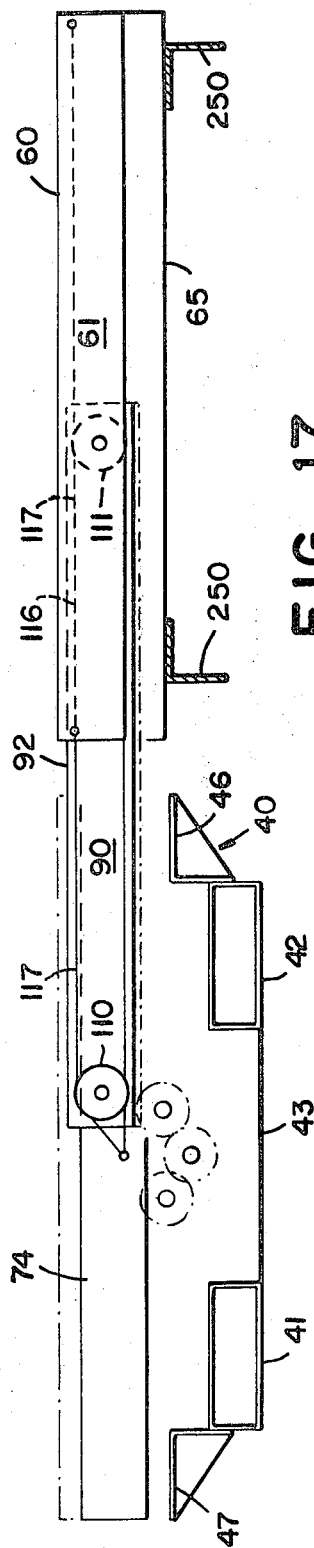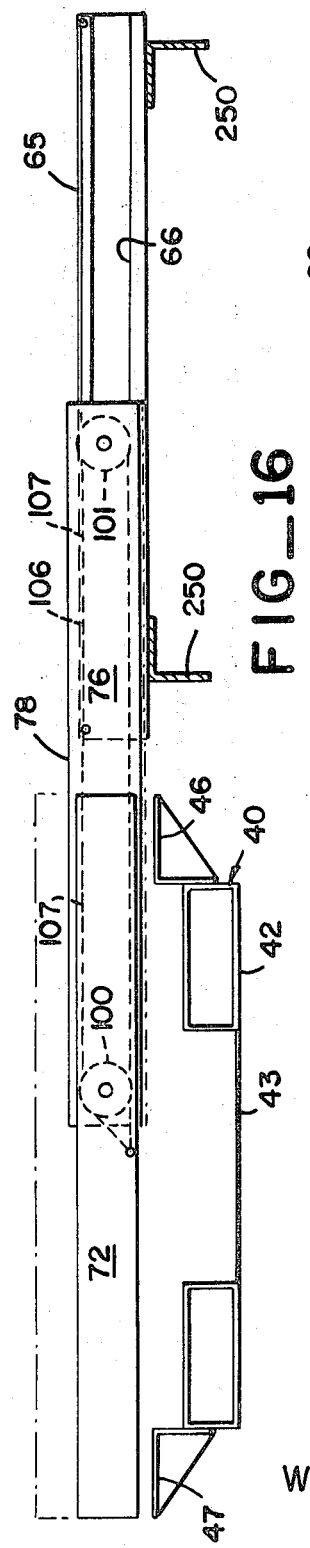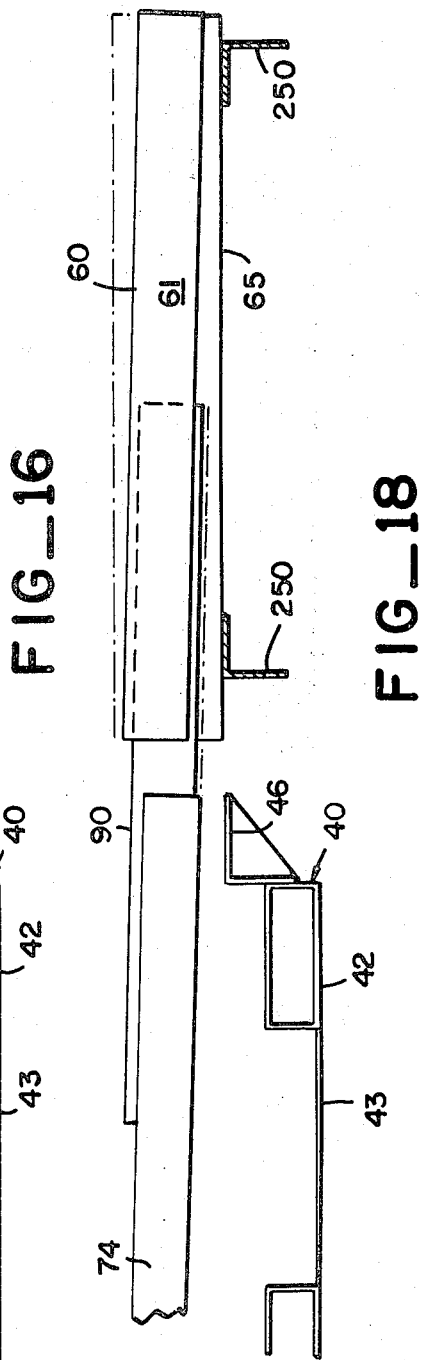

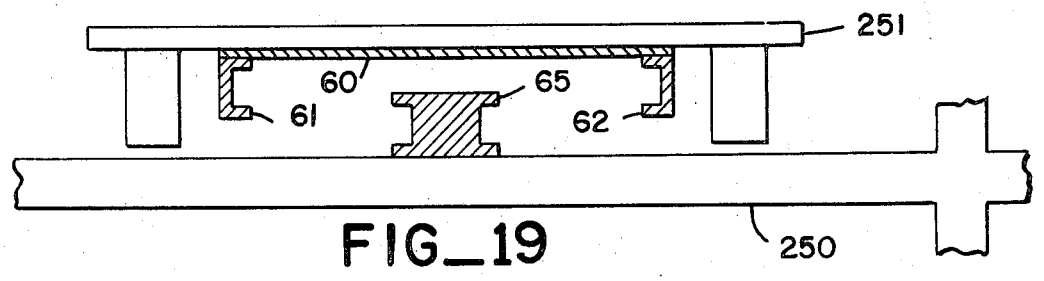
FIG_19
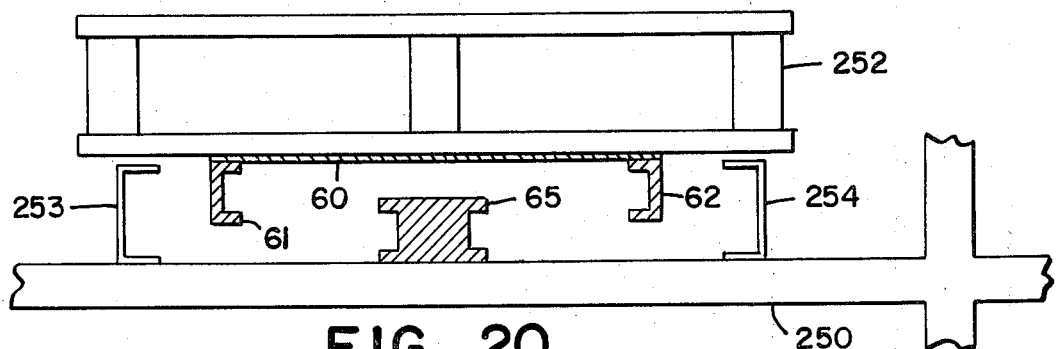
FIG_20
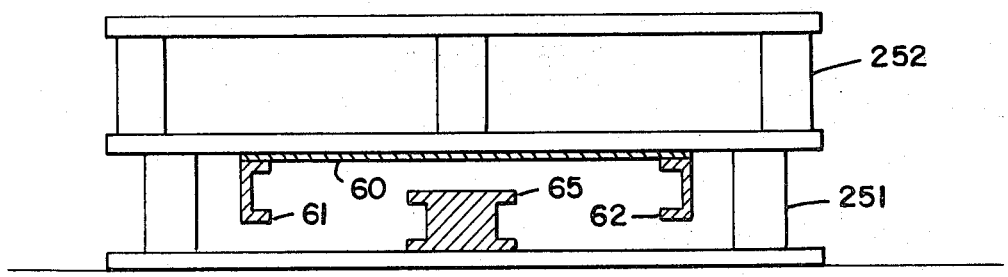
FIG_21
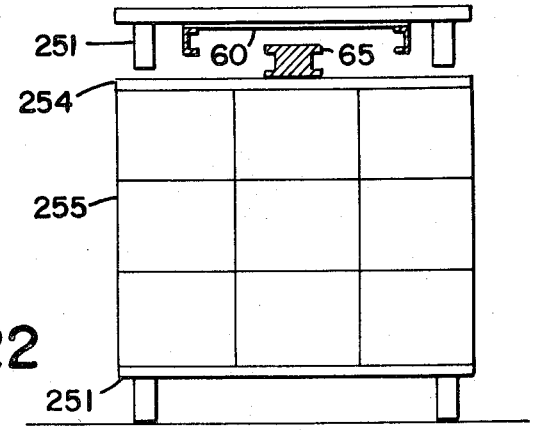
FIG_22
INVENTOR.
WILFRED ERNEST WILLIS
BY
Owen, Wickersham & Erickson
ATTORNEYS

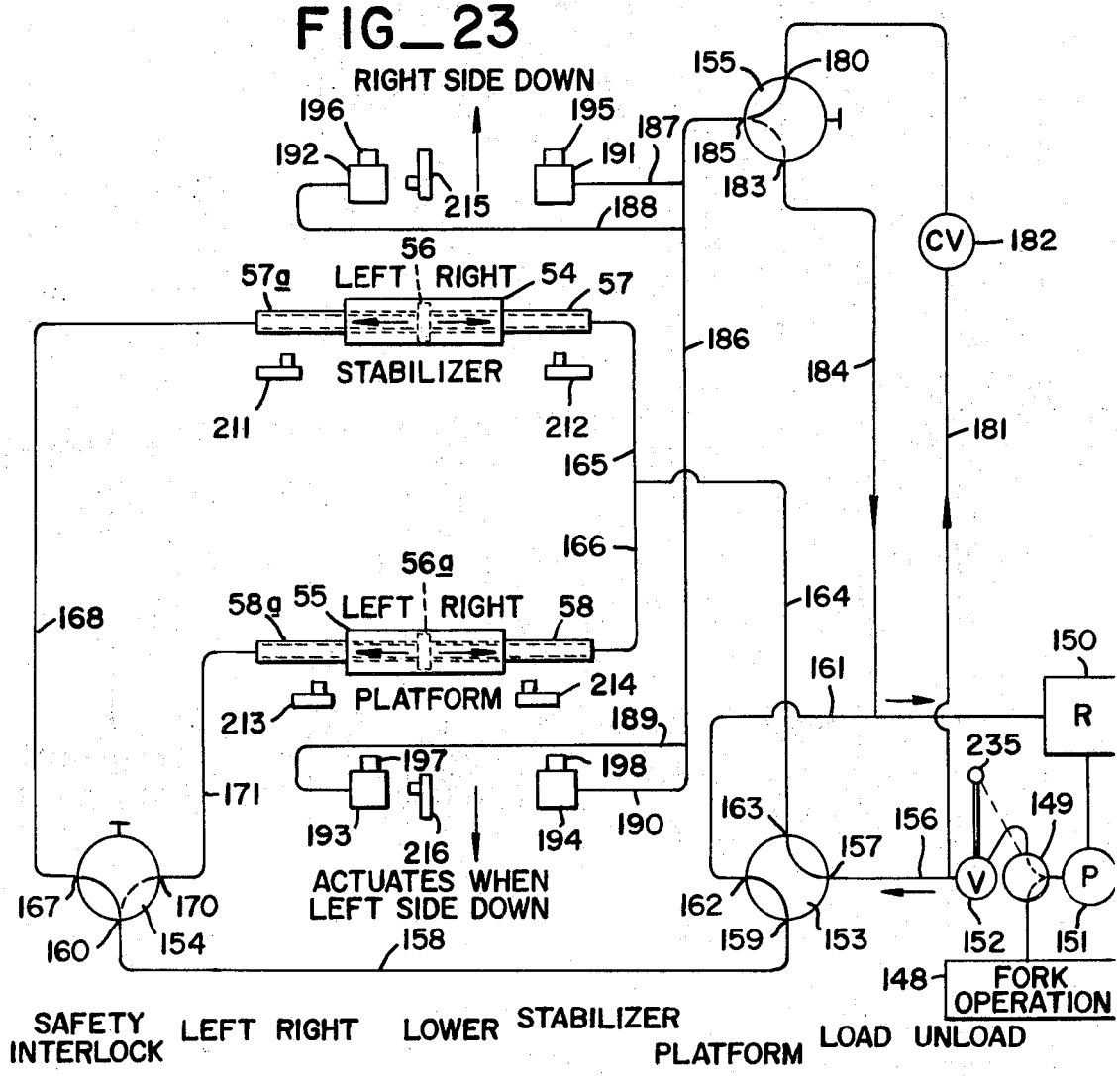
FIG_23
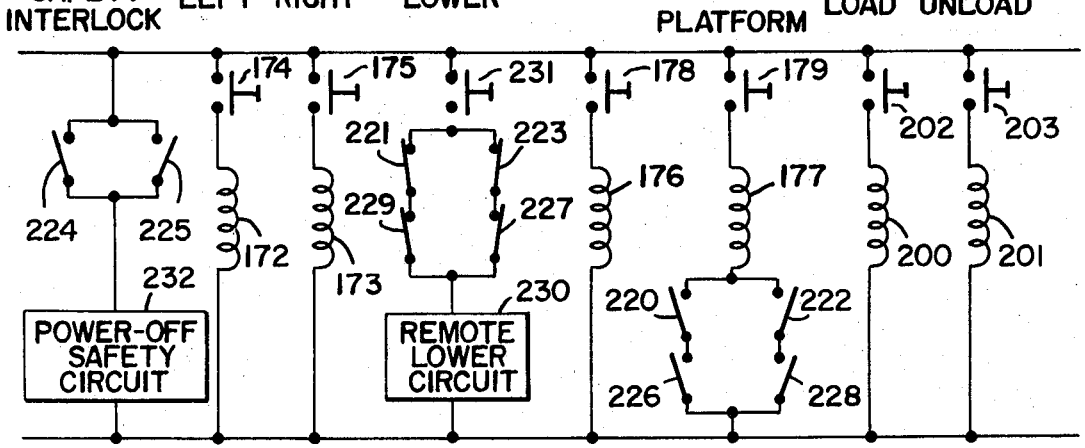
FIG_24

SIDE-LOADING ATTACHMENT FOR FORK-LIFT TRUCKS

This is a continuation of application Ser. No. 669,169, filed Sept. 20, 1967, now abandoned.

This invention relates to a side loading attachment for forklift trucks.

Normal forklift trucks pick up and discharge their loads in a line with the fore-and-aft axis of the forklift truck. As a result, the use of forklift trucks and pallet loads, though economical of manpower, requires large storage spaces in warehouses because the forklift trucks have to be maneuvered, turned to each side, and turned around. Because of the direction of discharge, wide aisles have to be provided so that the truck can turn to head toward the selected spot where it picks up or deposits its load. Thus, a very large proportion of the floor space of warehouses is given over to aisle passageways which are there only to enable the maneuvering of the forklift trucks.

In contrast with this, the present invention provides for loading and unloading the forklift truck along an axis perpendicular to the fore-and-aft axis of the truck, the forklift truck being provided with an attachment which moves out to the side to pick up loads or to deposit them. Thus, the aisles can be narrow and a good deal of space saved.

previous attempts to accomplish the same general end have met difficulties. Some of them have been limited to use with very specialized type of racks on which the loaded pallets are stored; the racks have to have two extra rails on every level of storage. There have been limitations as to the types of pallet that could be used. There has been no adequate stabilizer or counterbalance to prevent the truck from tipping over sideways when a heavy load is moved to one side or is being picked up far to one side, nor adequate means for preventing the load from being bounced. In some, the forklift attachment itself has taken up an excessive amount of room or has required too many special accompanying attachments. Some have been liable to misuse and damage to themselves or to the goods and have required special care and alertness on the part of operators. So far, such systems have received little recognition or use even though they have been available or have been known about for at least 15 years.

The present invention solves the problems involved and enables the use of a side loading attachment which is easily attached to the forklift truck and easily removed from it, which can be used with many different types of pallets and storage racks, and which enables compact storage of goods in a warehouse with narrow aisles. The invention provides for stabilization and also provides for substantially foolproof operation so that it becomes difficult if not impossible to commit serious mistakes in the basic operation of the system. Several important safety features are included.

Other objects and advantages of the invention will appear from the following description of a preferred form thereof.

In the drawings:

FIG. 1 is a simplified view in perspective of a forklift truck having on it an attachment embodying the principles of the invention, the forks and attachment being shown in the normal transporting position. One upper corner of the seat back is broken away to conserve space.

FIG. 2 is a view similar to FIG. 1 but with the forks lifted and the platform of the attachment extended to one side. This view also shows portions of racks on which the load is about to be deposited.

FIG. 3 is a view in side elevation of an attachment, like that in FIG. 1, embodying the principles of the invention. It may be considered as viewing FIG. 6 along the line 3-3.

FIG. 4 is a view in front elevation of the attachment of FIG. 3.

FIG. 5 is a view similar to FIG. 4 but partly broken off in order to conserve space, showing the attachment tipped as it might be by a heavy load or by extension to one side, with actuation of a sensing device. Also, one set of gears has been removed to show the set behind.

FIG. 6 is a view in section of the attachment frame taken along the line 6-6 in FIG. 3 with some parts broken away.

FIG. 7 is a view in side elevation of the frame only of the FIG. 6 assembly.

FIG. 8 is a fragmentary view in side elevation and in section of a portion of the device of FIG. 3.

FIG. 9 is a fragmentary view in elevation and in section taken along the line 9-9 in FIG. 8 with a portion thereof backed away slightly to the left to show a thrust bearing member.

FIG. 10 is a fragmentary view in elevation and in section taken along the line 10-10 in FIG. 8 with a portion thereof backed away slightly to the right to show a thrust bearing member.

FIG. 11 is a fragmentary view in section taken along the line 11-11 in FIG. 8.

FIG. 12 is a view in section taken along the line 12-12 in FIG. 7, but shown on a reduced scale.

FIG. 13 is a simplified view in perspective of the right angle drive with its input and output. Many parts are omitted to focus emphasis on the parts shown.

FIG. 14 is a view in end elevation of the attachment of FIG. 3 with the stabilizer elements advanced to approximately a half-way-out position.

FIG. 15 is a top plan view with both the stabilizer and the platform advanced all the way to position at one side of the forklift truck, the normal centered position of the platform shown in broken lines.

FIG. 16 is a view in side elevation and partly in section showing the stabilizer moved to its extreme position at one side for stabilizing the movement of the load supporting portion, which is still unmoved. The stabilizer then rests on a rack, which is shown in section.

FIG. 17 is a view similar to FIG. 16 with the load supporting platform also moved fully to its loading and unloading position to one side of the forklift truck.

FIG. 18 is a view similar to FIG. 17 with the load supporting platform tipped in order to deposit or pick up a load.

FIG. 19 is a view at right angles to FIGS. 16—18, and somewhat diagrammatic, showing the load supporting platform stabilizer as used with a skid pallet and a storage rack.

FIG. 20 is a view similar to FIG. 19 showing the use of a four-way pallet on a rack in conjunction with additional supporting members which are then required.

FIG. 21 is a view similar to FIG. 20 in which the system is used without a rack but with an inverted skid pallet on the floor, with the load supporting pallet thereabove.

FIG. 22 is a view similar to FIGS. 19—21 but reduced in size showing the application of a plywood member at the top of a deposited load to enable deposite of another skid pallet (and its load) on top of the deposited load, when the concentrated load of the skids is undesirable.

FIG. 23 is a diagram of the hydraulic circuit of the invention.

FIG. 24 is a diagram of the electrical circuit used in connection with the hydraulic system.

Any standard type of fork loading truck can be equipped with an attachment 30 embodying the principles of this invention. FIGS. 1 and 2 show one such forklift truck 31 having wheels 32 (the rear wheels are there but are not visible), a body 33, a driver's seat 34, a rear counterbalance portion 35, vertical columns 36 and 37 and a pair of forks 38 and 39 which are adapted to move up and down along the vertical columns 36 and 37. The forklift truck without this attachment 30 loads and unloads only head-on in line with the fore-and-aft axis. The invention may also be applied to forklift trucks where the forks can be rotated or used in other positions, but some of the advantages are lost thereby.

The attachment 30 (see FIGS. 1—4 and 6) comprises a frame 40 having a pair of rectangular socket members 41 and 42 in which the forks 38 and 39 are readily inserted. The entire attachment 30 is made so that it can be substantially the size of a pallet and therefore is fixed so that after it is on the forks 38 and 39, the whole attachment 30 can still get beneath a typical skid pallet. Preferably, the frame 40 has a thin bottom plate 43 (FIG. 4) to exclude dirt and to act as a guard for the working parts above this element. The socket members 41 and 42 are joined by a pair of parallel lateral beams 44 and 45, and the socket members 41 and 42 support brackets 46, 47, and 48.

The beams 44 and 45 support a pair of shafts 50 and 51 (see FIGS. 4 and 8). The shaft 50 is a pivot shaft, and the shaft 51 is a rotatable driven shaft. The frame 40 supplies an upper pair of journals 52 for the pivot shaft 50 at each of the beams 44 and 45 and a lower rotary bearing 53 for the rotating shaft 51, which is preferably directly vertically below the pivot shaft 50. The function of both of these shafts will appear soon.

Two hydraulic cylinders 54 and 55 are movable laterally on the frame 40. The cylinders 54 and 55 are not on the same level; the cylinder 54 is higher than the cylinder 55 and is used to operate a stabilizer 65, while the lower cylinder 55 is used to operate a platform 60. Each cylinder 54 and 55 has a piston 56 or 56a with two rods, one going out each end of the cylinder, rods 57 and 57a for the cylinder 54 and rods 58 and 58a for the cylinder 55, all the rods being held stationary by brackets 59. The rods 57, 57a, 58 and 58a are preferably all tubular and are used as conduits with ports or openings adjacent the pistons 56 and 56a, so that the hydraulic fluid is introduced through the rods.

The attachment incorporates a laterally movable platform 60 which carries the actual load, usually on a pallet, and is supported on two channel-shaped members 61 and 62 having channels 63 and 64. It also includes a central stabilizer 65 which is located beneath the platform 60 centrally in between the two side channel members 61 and 62 and is itself provided with a pair of channels 66 and 67. A basic idea of the invention is that the stabilizer 65, which does not carry any load besides its own weight, is moved out to the side before the platform 60 is moved, and the stabilizer 65 rests on a horizontal frame member 250 or on a lower pallet or load (see FIGS. 19—22) so as to make certain that the movement of the load or picking up of the load cannot unbalance the forklift truck. Only after the stabilizer 65 is in place is the platform 60 moved out beyond its centered normal transporting position. This is shown in FIGS. 16, 17, and 18, and it will be discussed in more detail later.

Two pairs of brackets 70 and 71 are bearinged and pivoted on the pivot shaft 50 and support two pairs of stationary channels 72, 73 and 74, 75. The channels 72 and 73 are on opposite sides of the stabilizer 65, and the channels 74 and 75 face the respective channels 61 and 62 beneath the platform 60. A pair of intermediate carriages 76 and 77 are associated with the stabilizer 65 in between the stabilizer 65 and its stationary channels 72 and 73 and are joined by braces or a top deck 78. Each carriage 76 and 77 carries two sets of axles 80 and 81 and on each axle is a roller 82 and 83. The rollers 82 on the one side are slightly higher than the rollers 83 on the other side, in order to make the most of the space that will be available. The rollers 82 run in the channel members 72 and 73, while the rollers 83 run in the channels 66 and 67. To prevent wear and to enable the stabilizer 65 and the channel members 72 and 73 all to be made from lightweight aluminum, good reinforcing steel plates 84 and 85 are provided for the rollers 82 and 83 actually to run on. Also, self-lubricating shims or thrust bearings 86 may be provided; these may be of Teflon-impregnated bronze, for example.

Similar intermediate carriages 90 and 91, bridged by a framing platform 92, are provided between the channel members 61, 62 and 74, 75, and are provided with rollers 95, 96, axles 93, 94, and reinforcing plates 97, 98. Self-lubricating shims or thrust bearings 87 may also be provided. In this instance the outside rollers 96 are more noticeably higher than the inside rollers 95 because of the space requirements.

The stabilizer 65 is moved out at twice the speed of its intermediate carriages 76, 77, and this may be accomplished with the aid of a cable system having a pair of bearinged pulleys 100 and 101 for each side of the stabilizer 65 mounted to rotate on shafts 104 and 105 attached to each carriage 76, 77, and a cable 106 has one end fastened to one end of the stabilizer 65 and its other end fastened to the frame 40, passing around the pulley 100 to make a U, while each cable 107 is fastened at one end to the opposite end of the stabilizer 65 and at its other end to the opposite end of the frame 40, passing around the pulley 101 to make a U. When the stabilizer 65 is in its centered or transportation position, each leg of the U is equal to the length of the stabilizer 65. A similar arrangement is used with the platform 60, where two bearinged pulleys 110 and 111 are mounted rotatably on shafts 114 and 115 on the intermediate carriages 90, 91; a cable 116 is fastened at one end to the frame 40 and passes around a pulley 110 and is secured at its other end to the platform 60, while a cable 117 connects the frame 40 to the other end of the platform 60 via the pulley 111.

Each intermediate member 76, 77 is provided with a rack 120 on its bottom surface which normally engages both of two pinion gears 122, 123. Since there is a pair of pinion gears 122, 123, one on each side of center, the rack 120 can actually pass a substantial distance beyond center, being then engaged with only one of the two pinion gears 122 or 123. Similarly, the intermediate members 90 and 91 each have a rack 125 and two pinions 126 and 127. If there were only a single pinion for each rack 120, 125, the racks 120 and 125 could only go out half their own width, and the load would not therefore clear the side of the machine adequately. With this device, it makes it possible for the platform 60 and stabilizer 65 to go out beyond center and to have the load carried fully beyond the machine or picked up from a point fully beyond the machine. The two pairs of pinion gears 122, 123, and 126, 127 are each driven by a driving gear 124, 128. The gear 124 for the stabilizer 65 is journaled rotatably on the end of the pivot shaft 50 and is driven by a driving shaft 131 from a gearbox right-angle drive assembly 130. A similar right-angle drive member 130a is connected with a driving connection 132 and keyed to the lower driving shaft 51, which drives a pinion gear 129 which in turn drives the gear 128, which is itself rotatably mounted on the pivot shaft 50.

The drive for the driving gears 124 and 128 and for the right-angle drive mechanisms 130 and 130a (see FIG. 13) is provided by a rack and pinion arrangement in which each of the two cylinders 54 and 55 is provided with a rack 133, 134 which, respectively, engages pinions 135 and 136, which in turn drive the right-angle drives 130 and 130a. One cylinder 54 is used to drive the stabilizer 65, and the other cylinder 55 is used to drive the platform 60.

Support axles 140 on the bracket 70 each rotatably support one pair of pinion gears 122, 123, and support axles 141 on the bracket 71 each rotatably support one pair of pinion gears 126, 172. Thus the pinion gears 122, 123, 126, and 127 and fixed members 72, 73, 74, 75, as well as the intermediate members 76, 77, 90, and 91 and the stabilizer 65 and platform 60 are pivoted on the pivot shaft 50 so that they can be tipped, and they are in fact tipped a short distance whenever the weight is unbalanced. A pair of sensors 215, 216 is provided, one on each side of the machine, and when the stabilizer 65 becomes tipped a certain distance one way or the other, the particular sensor on that side of the machine is actuated. The lowering of the forks 38 and 39 to get the stabilizer on a level with the storage rack 250 is stopped automatically at the right level by an interlock circuit when the stabilizer 65 is tipped against gravity. In other words, the forks 38 and 39 are initially lifted somewhat higher than the racks 250, and the stabilizer 65 is fully extended; it tips with gravity, actuating one sensor 215 or 216, and the forks 38 and 39 may then be lowered until the stabilizer 65 rests on the rack, lifting it against gravity until the other sensor 216 or 215 is actuated. As far as the platform 60 is concerned, it is purposely tipped at the end of its lateral travel to get the load off; so the operation is somewhat different and will be explained later.

The hydraulic system (see FIG. 23) includes a reservoir 150, a pump 151, and a valve 149 which sends fluid either to a normal control system 148 or to a flow control valve 152, all normally on the forklift truck. The remainder of the hydraulic system of this invention, except for small portions of the conduits, is on the attachment 30 itself, the conduits being connected to the reservoir 150 and the flow control valve 152.

Three solenoid-operated valves 153, 154 and 155, supported on the brackets 46, 47, and 48, are employed, one four-way valve 153 and two three-way solenoid valves, 154 and 155.

A conduit 156 leads from the flow control valve 152 to the inlet 157 of the valve 153. A conduit 158 leads from a fitting 159 in the valve 153 to the inlet 160 of the valve 154. A return conduit 161 leads from the outlet 162 of the valve 153 and carries the fluid back to the reservoir 150.

A fitting 163 of the valve 153 is connected to a conduit 164 which branches into conduits 165 and 166. The conduit 165 goes into a first side of the piston 56 of the stabilizer-moving cylinder 54 (preferably through the hollow rod 57) and the conduit 166 goes into the second side of the piston 56a of the platform moving cylinder 55 (preferably through the hollow rod 58).

A fitting 167 of the valve 154 is connected by a conduit 168 which goes to a second side of the piston 56 of the stabilizer cylinder 54 (preferably through the hollow rod 57a), while a fitting 170 is connected by a conduit 171 to the second side of the piston 56a of the platform cylinder 55 (preferably through the hollow rod 58a).

All the solenoid valves 153, 154, and 155 have two positions and are powered both ways. The solenoid valve 153 is powered by a solenoid 172 (see FIG. 24) for "left" operation, and by a solenoid 173 for "right" operation. When the solenoid 172 is energized, the input conduit 156 is connected through the inlet 157 and fitting 163 to the conduit 164 and thence by the conduits 165 and 166 to the stabilizer and platform cylinders 54 and 55. The fluid enters these cylinders from the first side and tends to move their cylinders in a direction that (when converted through the right-angle drive 130) achieves a "left" operation of the stabilizer 65 and platform 60. At the same time, the fitting 159 is connected to the outlet 162, so that the fluid in the conduit 158 is returned to the reservoir 150 via the conduit 161. The solenoid 172 may be actuated by a pushbutton 174, and the solenoid 173 may be actuated by a pushbutton 175. All of the solenoids in this invention need only momentary energization, and once they have moved to a position, stay there until the opposite solenoid is actuated. While pushbuttons are shown throughout, the operation may be automatic by relays or any other automatic switch controls.

The solenoid valve 154 is actuated by solenoids 176 and 177, which, in turn, are actuated by pushbuttons 178 and 179. The energization of the solenoid 176 by the button 178 connects the valve fitting 160 to the valve opening 167, and, therefore, connects the conduits 158 and 168 together for flow of the hydraulic liquid in either direction. Similarly, energization of the solenoid 177 by pressing the button 179 connects the conduit 171 to the conduit 158 for movement of the hydraulic fluid in either direction.

The solenoid valve 153 determines whether "left" or "right" movement will be accomplished, while the solenoid valve 154 determines whether the stabilizer 65 or the platform 60 is to move. There will, of course, be no movement at all if the flow control valve 152 is set for no flow, and the speed of movement is determined by how much the valve 152 is opened.

Thus, suppose that the stabilizer 65 is to be moved to the left, and then the platform 60 is to be moved to the left, either for deposit of a load or for picking it up. The operator momentarily pushes the buttons 174 and 178. Energization of the solenoid 172 will send fluid from the inlet line 156 via the conduits 164, 165, and 166 into the first side of both the stabilizer and platform cylinders 54 and 55. At the same time, the energization of the solenoid 176 acts to connect the conduits 168 and 158 together, and since the conduit 158 is also connected to the return line 161, the fluid at the first side of the stabilizer cylinder 54 can push the stabilizer cylinder 54 in the direction that moves the stabilizer unit 65 to the left. Nothing happens to the platform 60 because the conduit 171 is cut off and therefore the pressure in the conduit 166 does nothing. When the stabilizer 65 has been moved to its desired position and at such time as it is desired for the platform 60 to be operated, the operator presses the button 179, and the valve 154 is moved to connect the passages 171 and 158 together, shutting off the fitting 167 so that the fluid is held in the conduit 168. Then the platform 60 moves to the left.

For movement to the right, the operator presses the button 175 which sends fluid positively into the conduit 158 from the inlet conduit 156, while connecting the conduit 164 to the return conduit 161. As a result, if the platform cylinder 55 has already moved the platform 60 to the far left position and is to move back, say, to center position, then the fluid through the conduit 158 flows into the conduit 171 on the second side of the platform piston and forces the cylinder 55 to move the platform 60 to the right, while the conduit 166 returns fluid from there to the reservoir 150. When the platform 60 is in the desired position, then the operator presses the button 178 which connects the conduit 168 to the conduit 158 and the fluid moves the stabilizer cylinder 54 to send the stabilizer 65 toward the right. When he desires to stop all the motion, he does so by moving the flow control valve 152 to the zero position.

The solenoid valve 155 has an inlet 180 which is connected to the inlet conduit 156 by a conduit 181 having therein a check valve 182 to prevent flow back through from the inlet 180. A return outlet 183 sends fluid into the conduit 184 which joins the main return conduit 161. A third fitting 185 sends fluid into a conduit 186 which is connected to branch conduits 187, 188, 189 and 190 which are respectively connected to hydraulic cylinders 191, 192, 193, and 194. These cylinders actuate their pistons to raise the rods 195, 196, 197, and 198. When the rods are fully extended, as they are in the transporting position of the pallet, then the pallet platform 60 is leveled.

When the inlet 180 is connected to the fitting 185, the fluid from the inlet 180 goes into the hydraulic cylinders 191, 192, 193, 194, and causes them to extend their rods 195, 196, 197, and 198 to the full position and then holds. When it is to be let off, the fitting 185 is connected to the outlet 183, and the rods push the hydraulic fluid back to the return conduit 184. When the platform 60 is to be tipped, or when the device is empty and the stabilizer 65 is to be moved out, the piston rods 195, 196, 197, and 198 are all lowered in this manner. The solenoid valve 155 is thus used to either pick up a load or to deposit a load. It has solenoids 200 (for loading) and 201 (for unloading) actuated respectively by the switch buttons 202 and 203.

Also shown in the hydraulic circuit diagram as well as in the electrical circuit diagram are a set of six limit switches 211, 212, 213, 214, 215, and 216. The limit switches 211 and 212 determine when the stabilizer 65 is fully extended and in which direction, and act to prevent extension of the platform 60 in either direction unless the stabilizer 65 is fully extended. The limit switches 213 and 214 indicate whether the platform is moved off center. The limit switches 215 and 216 are actuated by the stabilizer tilting either with or against gravity, and hence indicate whether it is supported.

The limit switch 211 actuates two switch mechanisms, a normally open pair of contacts 220 and a normally closed pair of contacts 221, and the limit switch 212 operates a normally open pair of contacts 222 and a normally closed pair of contacts 223. The limit switch 213 actuates only a normally open pair of contacts 224, and the limit switch 214 actuates a normally open pair of contacts 225. The limit switch 215 operates both a normally open pair of contacts 226 to close them, and a normally closed pair of contacts 227 to open them. The limit switch 216 actuates to close the normally open pair of contacts 228 and to open a pair of normally closed contacts 229.

As shown in the electrical circuit diagram, FIG. 24, the solenoid 177 is in series with a parallel network comprising the contacts 220 and 226 on one branch and 222 and 228 on the opposite branch, all normally open. Thus, the solenoid 177 cannot be actuated unless the contacts in one of these two branches is closed. The contact 220 is closed when the limit switch 211 is depressed (actuated). Therefore, that means that the stabilizer 65 has been fully extended to the left and has swung down by its weight about the pivot shaft 50, unless the operator has lowered the fork sufficiently to tilt the stabilizer against gravity and thus support it. The stabilizer 65 must not only be fully extended; it also must be tilted against gravity and therefore actuate the limit switch 215 to close the contacts 226 for the solenoid 177 to have a completed circuit when the stabilizer 65 is extended to the left. If extended to the right, the contacts 222 and 228 are closed by similar means by operation of the limit switches 212 and 216.

The operator tilts the stabilizer 65 against gravity by getting the forks at the proper level. He does this by lowering the forks 38 and 39. A remote lower circuit 230 (a well-known attachment for fork trucks varying somewhat with the particular fork truck used) is provided along with a pushbutton 231 for lowering the forks 38 and 39. This circuit 230 is in parallel with the normal circuit used by the operator when not using the attachment. The circuit 230 and button 231 are in series with a network comprised of two parallel branches, one having the normally closed contacts 221 and 229, and the other with the normally closed contacts 223 and 227. Upon proper adjustment of the level to insure that the stabilizer 65 has found support, the operator then has his platform operating solenoid 177 in a position where he can actuate it by pressing the button 179.

So long as the platform 60 is extended, a safety feature provides for the impossibility of operating the truck 31 and of raising the forks. The operation of the truck is prevented by the fact that the switch contacts 224 and 225 are both normally open, and they are in that position when the platform 60 is in the center. However, whenever the platform 60 moves any amount at all to either the left or the right, it closes against the limit switch 213, and that limit switch remains closed as long as the pallet is out of center position. Closing of the switch 213 closes the contacts 224, and closing of the switch 214 closes the contacts 225, and if either of these things happens, a power-off safety circuit 232 (a well-known attachment for fork trucks, varying somewhat with the particular truck used) nullifies operation of the fork truck so that it cannot go forward or back or raise the forks.

One further switch is provided preferably as a button 235 in the handle of the flow control valve 152, which operates the valve 149 to send the hydraulic fluid to the auxiliary hydraulic circuit when starting the pump 151 for that circuit or some other system 148 and diverts oil to that attachment. At the same time this switch 235 closes off operation elsewhere.

As shown in FIGS. 16 through 18, the stabilizer 65 is extended first and when it is fully extended, acts to stabilize the machine and then the platform 60 is extended, whether empty or bearing a load. If it bears a load, and the load is to be dumped, the platform 60 is tipped, as shown in FIG. 18, and then is withdrawn, the stabilizer 65 being withdrawn later.

As shown in FIG. 19, the device is probably used most conveniently with a permanent system of racks 250 and with skid pallets 251. The skid pallets 251 sit on the racks 250 and are raised therefrom by use of the cylinders 191, 192, 193, 194, when the platform 60 is beneath the pallet 251.

The stabilizer 65 makes it impossible for the device to be placed within a normal type of reversible pallet 252 and therefore when such a reversible pallet is used, some expedient has to be used, as in FIG. 20, where a pair of channels 253 and 254 are mounted on the rack 250; then the stabilizer 65 and platform 60 can go beneath the pallet 252.

Another way of working is to deposit a skid pallet 251 upside down on the floor and then to deposit the working pallet 252 on that. An additional skid pallet 251 could be placed on top of the load if an additional reversible pallet 252 were used on the next load. When this is done, skid pallets 251 are also used at the other locations to which the load is carried.

As shown in FIG. 22, the device may be used with skid pallets 251 without any rack 250 and in that event, it may be advisable to place a plywood panel 254 on top of one load 255 when depositing the next load on top of that, to distribute the concentrated load under the skids.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A side loading attachment for forklift trucks used in conjunction with load supporting pallets and pallet-supporting means, including in combination:
    an attachment frame;
    a stabilizer laterally disposed with respect to said frame and supported thereon for movement laterally thereof;
    a pallet-and-load supporting platform laterally disposed with respect to said frame at a level above said stabilizer and supported by said frame at all times separately from said stabilizer for movement laterally of said frame, wholly independently of the position of said stabilizer;
    means for moving said stabilizer to one side of said frame for engagement with and rest upon a said pallet supporting means on which a said pallet and its load are to be deposited; and
    means for moving said platform out where it lies wholly beyond said forklift truck.

2. The attachment of claim 1 having means for tipping said platform down at its outboard end, so as to deposit a load carried on said platform upon a said pallet supporting means and for inserting said platform under a pallet already upon a said pallet supporting device.

3. The attachment of claim 2 having means for reerecting and leveling said platform after it has been tipped.

4. The attachment of claim 1 wherein said frame has fore-and-aft extending sockets for receiving the forks of said lift truck to support the attachment on said lift truck.

5. A side loading attachment for forklift trucks used in conjunction with load supporting pallets and pallet supporting storage devices, including in combination:
    an attachment frame having fork receiving socket;
    a stabilizer laterally disposed with respect to said frame and supported thereon for movement laterally thereof;
    a pallet-and-load supporting platform laterally disposed with respect to said frame at a level above said stabilizer and supported at all times by said frame separately from said stabilizer for movement laterally of said frame, wholly independently of the position of said stabilizer;
    means for moving said stabilizer to either side of said frame where it lies wholly beyond the sides of the forklift truck on which attachment is carried, for engagement with and rest upon a said pallet supporting storage device on which a said pallet and its load are to be deposited; and
    means for moving said platform out where it lies wholly beyond said forklift truck only after said stabilizer has been extended and is supported by a said pallet supporting device.

6. The attachment of claim 5 having means for tipping said platform down at its outboard end and means for reerecting and leveling said platform after it has been tipped.

7. A warehouse system, comprising:
    a forklift truck having fore-and-aft extending forks;
    at least one load supporting pallet;
    at least one pallet supporting means; and
    a side loading attachment on said forklift truck, said attachment including in combination:
        an attachment frame;
        a frame supported laterally disposed and laterally extendable a stabilizer;
        a frame supported laterally disposed and laterally extendable pallet-and-load supporting platform at a level above said stabilizer, said platform at all times being supported solely by said frame and independently of said stabilizer, for movement laterally of said frame independently of said stabilizer and of the amount by which said stabilizer has been moved;

means for moving said stabilizer to at least one side of said frame for engagement with and rest upon a said pallet supporting means; and means for moving said platform independently of said stabilizer out beyond at least one side of said frame.

8. The system of claim 7 having means for tipping said platform down at its outboard end.

9. The system of claim 8 having means for reerecting and leveling said platform after it has been tipped.

10. The system of claim 7 having means preventing moving said forklift truck unless said platform is centered on said attachment frame.

11. The system of claim 7 having an hydraulic system controlling the movement of said stabilizer and the movement of said platform.

12. A warehouse system, comprising:
 a forklift truck having fore-and-aft extending forks;
 a plurality of load supporting pallets;
 a plurality of pallet supporting storage devices; and
 a side loading attachment on said forklift truck, said attachment including in combination:
  an attachment frame having fork receiving sockets in which said forks are engaged;
  a frame supported laterally disposed and laterally extendable stabilizer;
  a frame supported laterally disposed and laterally extendable pallet-and-load supporting platform at a height above said stabilizer, said platform at all times being wholly supported by said frame independently of said stabilizer and being laterally extendable of said frame independently of said stabilizer and of the position of said stabilizer;
  means for moving said stabilizer to either side of said frame for a distance where said stabilizer lies wholly beyond the sides of said forklift truck, for engagement with and rest upon a said pallet supporting storage device; and
  means for moving said platform out beyond either side of said frame only after said stabilizer has been extended and is supported by a said pallet supporting storage device.

13. The system of claim 12 having means for tipping said platform down at its outboard end and means for reerecting and leveling said platform after it has been tipped.

14. The system of claim 12 having means preventing moving said forklift truck unless said platform is centered on said attachment frame.

15. A side loading attachment for forklift trucks, including in combination:
 an attachment frame adapted for mounting at the front end of a forklift truck;
 a first pair of parallel, spaced-apart stationary channel members each having a channel therein, supported sideways on said frame;
 a second pair of parallel, spaced-apart stationary channel members each having a channel therein and located back-to-back next to and parallel to said first pair and spaced further apart than said first pair, supported sideways on said frame;
 a first pair of intermediate carriages parallel to each other and within the space between said first pair of stationary channel members and having a series of rollers on each side thereof, namely, a first series of said rollers riding in said first channels and a second series of rollers;
 a stabilizer located midway between said first carriages and having channels on opposite sides thereof in which said second series of rollers ride;
 a second pair of intermediate carriages forming the channels of said second pair of stationary channel members and further apart from each other than are the second pair of stationary channel members, having a series of rollers on each side thereof, namely, a third series of rollers for said second channels and a fourth series of rollers;
 a load supporting platform above said stabilizer, stationary channel members, and carriages having a pair of supporting channel members on each side thereof facing said second carriages and with channels in which said fourth series of rollers of said carriages ride;
 a pair of pulleys on each said carriage;
 a cable for each said pulley, each cable extending from said frame via a said pulley and comprising a first cable;
 a cable attached to one end of said stabilizer, a second cable attached to the other end of said stabilizer, a third cable attached to one end of said platform, and a fourth cable attached to the other end of said platform; and
 means for driving each said pair of intermediate carriages separately.

16. The attachment of claim 15 having a pivot shaft on said frame, said stationary channels and said means for driving all being supported by said pivot shaft.

17. The attachment of claim 16 wherein said frame has a plurality of hydraulic cylinders with vertically disposed piston rods capable upon actuation of engaging the bottom of said platform and leveling it.

18. The attachment of claim 17 having means for indicating when said stabilizer is tipped about said pivot shaft.

19. The attachment of claim 17 having means for preventing operation of the means for driving associated with said platform unless said stabilizer is fully extended to one side of said attachment.

20. The attachment of claim 18 having also means for preventing operation of the means for driving associated with said platform unless said stabilizer is tipped against gravity about said pivot shaft indicating support of said stabilizer.

21. The attachment of claim 15 wherein said means for driving comprises a rack secured to each said intermediate carriage, pinion means supported by said frame for driving each said rack, and means for driving said pinion means.

22. The attachment of claim 21 wherein said means for driving comprises a pair of hydraulic cylinders mounted fore-and-aft of said frame, and right-angle drive means connecting said cylinders to said pinion.

23. The attachment of claim 15 having fork receiving sockets for supporting said attachment by the forks of a fork lift truck.

24. The attachment of claim 15 wherein said means for driving each pair of intermediate carriages includes a hydraulic cylinder having a stationary piston and a movable cylinder body having a rack supported thereon, a pinion engaged by said rack, and gear train drive means connected to said pair of intermediate carriages.

25. The attachment of claim 24 wherein said piston has a pair of hollow tubes, one extending out each end of said frame and secured to said frame and a port adjacent said piston, for introducing hydraulic fluid into said cylinder.

26. Side loading means for and supported by the forks of a forklift truck, comprising:
 a stabilizer element supported by and extendable laterally in respect of said truck forks;
 a load supporting structure likewise supported at all times by said forks independently of said stabilizer element and movable laterally, for a distance greater than its own lateral width and beyond the side edge of said forks; and
 means for moving said structure when said stabilizer element is extended.

27. Side loading means for a forklift truck comprising:
 a self-contained attachment mountable on and removable from the forks of the truck, said attachment including
 a stabilizer element;
 power means for extending and retracting said stabilizer element laterally in respect of the forks;
 a load supporting structure;

guide and support means supporting said structure independently of said stabilizer element and enabling lateral movement of said structure relative to the remainder of said attachment for a distance greater than the lateral width of said structure and beyond the side edge of said attachment; and power means for moving said load supporting structure laterally on said guide and support means in respect of the forks when the said stabilizer element is extended, said stabilizer element being adapted to be supported, when extended, by structure external to and independent of the truck.